Oct. 20, 1959 D. G. SCORGIE 2,909,723

HIGH SPEED MAGNETIC AMPLIFIER

Filed Jan. 6, 1954

INVENTOR
DONALD G. SCORGIE

BY D. G. Scorgie
Howard White
ATTORNEYS 2,909,723
Patented Oct. 20, 1959

2,909,723

HIGH SPEED MAGNETIC AMPLIFIER

Donald G. Scorgie, Forestville, Md.

Application January 6, 1954, Serial No. 402,610
8 Claims. (Cl. 323—89)
(Granted under Title 35, U.S. Code (1952), sec. 266)

Figure 1:
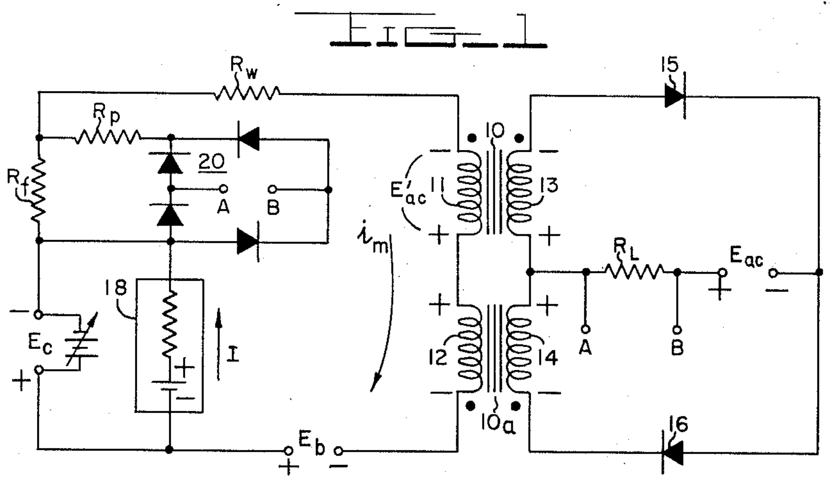

This invention relates to high gain, high speed of response magnetic amplifiers wherein the delivery of electrical power to an electrical load may be controlled from an extremely low power direct current signal source.

With the increasing development in magnetic materials, particularly materials of the grain-oriented nickel iron type, the vacuum tube control system in the field of industrial electronics has been gradually giving way to more robust, reliable magnetic amplifier control system. The magnetic amplifier control in addition to being rugged and reliable has the further advantage of being instantly available; that is, it requires no heater warm-up periods. This latter feature further operates to minimize the idle standby power requirements of the control system which is also of great importance in some installations.

Although there are many possible ramifications in the design of magnetic amplifiers, the so-called reset amplifier recently reported by R. A. Ramey in his article "On the Mechanics of Magnetic Amplifier Operation," AIEE Transactions, volume 70, part II, pages 1214 to 1223, has caught the fancy of the industry since this amplifier offers many important advantages over those heretofore known. Specifically the reset amplifier as reported by Ramey offers extremely high speed of response and high gain. As set forth by Ramey the concept involved in the design of his unique amplifier is that the amplifier is a voltage sensitive device rather than a current sensitive device as was previously conceived. In accordance with Ramey the core material employed by the amplifier must be of the high remanent, square hysteresis loop type, such as is displayed by materials of the Deltamax and Orthonol families.

In the single core version, for example, the above mentioned reset amplifier includes a saturable core member usually a toroid on which is wound a control winding and a load winding. The load winding is connected in series through a halfwave rectifier to the load to be driven and an alternating voltage, usually of power line frequencies, is connected across the entire series combination. The halfwave rectifier acts to permit only the alternate half-cycles of the supply voltage to be applied to the load winding and the load. The flow of current through the load is initially limited to the magnetization current of the core until the core becomes saturated. After saturation and for the rest of the applied load voltage half-cycle (hereinafter referred to as the forward half-cycle) only the load itself limits the flow of current in the load circuit. To control delivery of power to the load, the magnetization level of the core is periodically reset by the control circuit to some value of magnetization below saturation during the half-cycles immediately preceding the forward half-cycle. These half-cycles (hereinafter referred to as the reset half-cycles) are obtained by connecting the control winding through a half-wave rectifier to an alternating voltage of the same phase and frequency as the load voltage. The control rectifier is poled to permit the application of a control voltage pulsation to the control winding only during the half-cylces intermediate the application of the load voltage to the load winding. The load and control windings thus receive half-cycle voltage pulsations in alternation. The pulsating voltage applied to the load winding operates to shift the flux level of the core in one direction toward saturation while the voltage alternately applied to the control winding operates to shift the flux level of the core away from saturation. The core itself, as indicated above, must having high remanence, square hysteresis loop properties and in accordance with the underlying theory expressed by Ramey the unsaturated flux level established in the core at the end of an applied voltage pulsation is dependent upon the volt-second value of the applied voltage pulsation. In practice the volt-second value of the voltage pulsation applied to the load winding is chosen so that it, acting by itself, is just sufficient to saturate the core; that is, to drive the core from one knee of the hysteresis characteristic to the other knee with each pulsation. The volt-second value of the voltage pulsation applied to the control winding is made adjustable between the limits of zero and a value equal to the time integral of the load voltage pulsation. Thus, in operation when the control voltage volt-second value is adjusted to equal that of the pulsating load voltage the flux level of the core is periodically shifted back and forth from one knee of the hysteresis loop to the other without the delivery of power to the load. Adjustment of the time integral of the control voltage pulsation to a value less than that mentioned above means that during the application of the control voltage pulsation the flux level of the core is reset to some point intermediate the knees of the hysteresis loop. Thus during the next application of a load voltage pulsation only a part of such voltage pulsation is needed to raise the flux level of the core back to saturation. The remaining portion of the load voltage pulsation is then delivered to the load.

Although the above amplifier represents a marked advance in the art, permitting higher gain, higher speed of operation and generally better all around amplifier performance than previously obtainable, there are certain shortcomings present therein. For example, a rectangular loop core material is a more or less rigid requirement for good amplifier performance, and even the highest quality material now available when employed in an operating circuit of the above type has a dynamic hysteresis characteristic which is not perfectly rectangular; that is, it has a ratio of saturation flux to remanent flux greater than unity. Also the rectifiers required by the load and control winding circuits are temperature sensitive so that the amplifier characteristics are subject to drift with temperature variations.

It is, accordingly, an object of the present invention to provide a stable, high gain, high speed of response magnetic amplifier wherein the output may be controlled from an extremely low power direct signal source.

It is another object of the present invention to provide an amplifier wherein either high or low remanent cores may be used.

It is another object of the present invention to provide a magnetic amplfier offering high gain, high speeds of response and excellent temperature stability.

Figure 2:
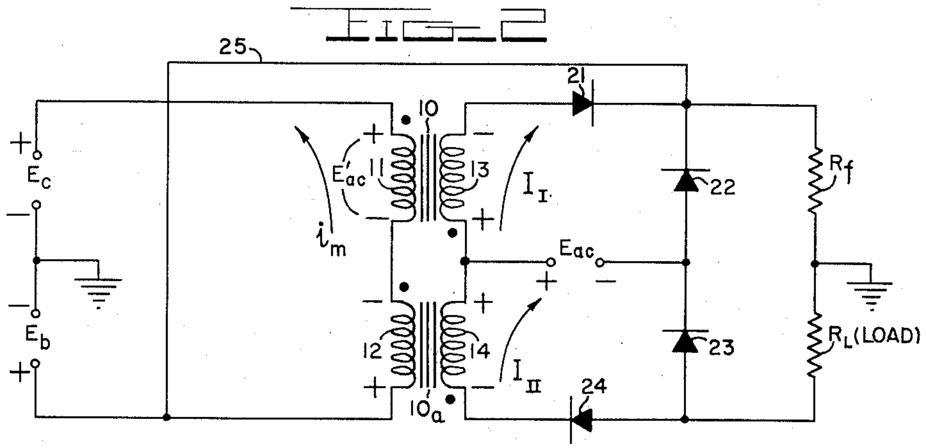
Figure 3:
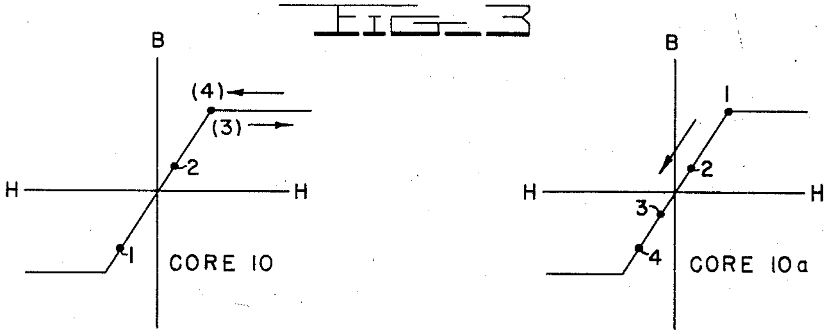

Other objects and features of the present invention will become apparent upon a careful consideration of the following detailed description when taken together with the accompanying drawings in which:

Figures 1 and 2 show in schematic diagram form typical embodiments of the present invention, and Figure 3 shows in simplified graphical form the hysteresis characteristic of one type of core material which may be employed by the present amplifier.

Referring now in particular to Figure 1 of the drawings there is shown an amplifier system constructed in accordance with the teachings of the present invention, wherein a variable direct voltage source is used to control the application of an alternating voltage to a suitable alternating current load impedance. As illustrated by the drawings, the amplifier embraced by Figure 1, includes a pair of similar saturable cores 10 and 10*a* of either high or low remanent material. On each core is wound similar load windings 13 and 14 and control windings 11 and 12. The load to be driven, here shown as a simple resistance labeled $R_L$, is connected in series with the energizing source therefor, $E_{ac}$. The load circuit is completed for one half-cycle of the supply voltage $E_{ac}$ through the series connection of source $E_{ac}$, load $R_L$, load winding 13 and half wave rectifier 15, and for the other half-cycle of the supply voltage $E_{ac}$ through the series connection of source $E_{ac}$, load $R_L$, load winding 14 and half wave rectifier 16. As shown in the drawings the rectifiers 15 and 16 are metal rectifiers, but if preferred they may be thermionic. With this arrangement, as will be subsequently described in more detail, the cores 10 and 10*a* are driven to saturation in alternation by the application of the supply voltage $E_{ac}$ to the appropriate load winding so that one core is proceeding to saturation while the other core is being reset by the application of a controlled reset voltage to the control circuit. To control the delivery of power to the load $R_L$, the reset voltage applied to the control circuit including control windings 11 and 12 is made adjustable. In this embodiment a suitable adjustable direct voltage source $E_c$ is used, although a variable impedance could be employed if desired. More particularly, the control circuit includes the series connection of control windings 11 and 12 in series with a first direct current voltage $E_b$, later described in detail, a variable D.C. control voltage $E_c$ and series resistances $R_f$ and $R_w$. The former resistor $R_f$ represents a feedback resistance and will be described in more detail subsequently, while the other resistance $R_w$ represents the resistance of the control windings. As will also subsequently be described, the current flow through the control circuit is held virtually constant at the magnetizing current $I_m$, of the cores, and to prevent excessive backward current flowing through the control voltage $E_c$ a suitable constant current source indicated in general at 18 and including as an example a high voltage and a high resistance in series is connected in the control circuit winding. In this embodiment the constant current source is connected directly in shunt with the control voltage $E_c$ and this current source is set to deliver a value of current I, which is substantially equal to or slightly smaller than the magnetizing current $I_m$ that flows in the control windings 11 and 12. To render the control of the amplifier directly proportional to the control voltage $E_c$, the direct voltage $E_b$ is made equal to but opposite the magnetizing current drop in the resistances $R_f$ and $R_w$.

In the present invention, reset is accomplished by the use of a combined internal-external feedback system. The internal feedback present in the system corresponds to the voltage $E'_{ac}$ induced in the control winding of the core experiencing a forward half-cycle. Since this induced voltage will disappear after saturation of the associated core, an external feedback system including a full-wave bridge rectifier indicated in general at 20 is added to the circuit. Bridge 20 has its input terminals A and B connected, by leads not shown, across the load resistance $R_L$ and its output terminals connected across the feedback resistor $R_f$ through the voltage dividing resistor $R_p$. The external feedback circuit operates to deliver to the control circuit, across resistance $R_f$, a feedback voltage equal to the induced voltage $E'_{ac}$ after saturation of the core through which load current instantaneously flows.

The windings on the cores have the polarity indicated by the dot convention shown adjacent the windings. These dots indicate that a voltage impressed on either the load or the control winding with a given polarity at the dotted terminal of the associated winding will induce a voltage in the other winding which has the same polarity at its dotted terminal.

In operation assume that the alternating voltage $E_{ac}$ has the instantaneous half-cycle polarity indicated in the diagram, in which case core 10 is on its forward half-cycle by virtue of the application of the supply voltage $E_{ac}$ to load winding 13, and core 10*a* is on its reset half-cycle. During this half-cycled rectifier 15 permits current to flow through load winding 13 and rectifier 16 blocks current flow through winding 14. Before core saturation the current flowing through the load circuit is proportional to the magnetization current of core 10, which magnetization current induces a voltage $E'_{ac}$ in the control winding 11 of core 10 with the polarity indicated. Assuming that there is a one-to-one ratio between the control winding 11 and load winding 13 the induced voltage $E'_{ac}$ will have the same magnitude as the applied voltage $E_{ac}$. Thus during this phase of amplifier operation, the voltages in the control circuit are equal to the induced voltage $E'_{ac}$ plus voltage $E_b$ minus the control voltage $E_c$ and the $I_mR$ drops in $R_f$ and $R_w$. Since $E_b$ is equal to and opposes the $I_mR$ drops in $R_f$ and $R_w$, the net reset voltage present in the control circuit is simply equal to $E'_{ac}$ minus $E_c$. This voltage is impressed across the control winding 12 of core 10*a* and causes that core to proceed to reset at a rate proportional to this voltage. The current flowing in the control circuit is limited by the core being reset to the magnetizing current of the resetting core, and since this current is essentially equal to or slightly greater than the current carrying capacities of constant current device 18 substantially all the current in the circuit flows through device 18. After saturation of core 10 the supply voltage $E_{ac}$ disappears from winding 13 since the inductance of this winding suddenly disappears. Concomitantly the induced voltage $E'_{ac}$ disappears. As the supply voltage $E_{ac}$ disappears from the load winding 13 it appears across the load resistance $R_L$ and this voltage is instantaneously fed back through terminals A and B and the full-wave rectifier bridge 20 and the voltage dividing resistances $R_p$ and $R_f$ to the control circuit to thereby take the place of the $E'_{ac}$ feedback voltage formerly induced in winding 11. In the next half-cycle of applied $E_{ac}$ voltage the polarities of the applied voltage $E_{ac}$ reverses and the induced voltage $E'_{ac}$ now appears across winding 12 of core 10*a* causing core 10*a* to now experience a forward half-cycle, and core 10 a reset half-cycle. Thus with the embodiment depicted in Figure 1 the core undergoing reset first obtains its resetting voltage from the internal feedback voltage being induced in the control winding of the forward half-cycle core and then after saturation of the forward half-cycle core the reset voltage is instantaneously and externally fed back from the load circuit to feedback resistor $R_f$ through bridge 20. Consequently the reset of the cores becomes independent of any previous history of the forward half-cycle core since the resetting voltages are always equal to $E'_{ac}$ minus $E_c$ and so long as $E'_{ac}$ is constant the reset will be independent of the core history.

The resistance $R_p$ is included only to provide the proper voltage division between $R_p$ and $R_f$ to accommodate for the turns ratio used between the control and load windings of the cores. That is, the voltage division produced by the ratio of $R_p$ to $R_f$ is such that the external feedback voltage developed across $R_f$ equals the internal feedback voltage $E'_{ac}$ induced in the control windings, and should this ratio between the core windings equal unity then $R_p$ is unnecessary and may be omitted.

To briefly illustrate the manner in which control is obtained assume first that a unity turn ratio between load and control winding is used for each core and that the $E_c$ control voltage is adjusted to zero in which case the resetting voltage for the core undergoing reset will simply be equal to $E'_{ac}$, therefore the voltage integral applied to the control windings of the cores during reset will be the same as that applied to the core during the forward half-cycle so that minimum output will be delivered to the load. This output will increase in direct proportion to the application of $E_c$ to a point where full output is obtained when $E_c$ is equal in magnitude to $E'_{ac}$ so that resetting voltage which was formerly expressed as $E'_{ac}$ minus $E_c$ is zero in which case no reset is obtained and therefore full power is delivered to the load. To prevent the core which is on its forward half-cycle from shorting out the core which is undergoing reset, after the core on the forward half-cycle has gone to saturation, it is preferred that the winding resistance of the load windings be appreciable relative to the load resistance.

An alternate embodiment of my invention is shown in Figure 2 which illustrates one circuit for delivering full-wave power to a load $R_L$. In this embodiment the supply voltage $E_{ac}$ is alternately coupled to the load windings 13 and 14 through a bridge rectifier including rectifiers 21, 22, 23, 24 which are arranged so that the supply voltage is connected across one pair of diagonal terminals of the bridge and the load resistance $R_L$ together with the appropriate feedback resistance $R_f$ is coupled across the other pair of diagonal terminals of the rectifier bridge. In this embodiment the feedback resistance $R_f$ is chosen in the same ratio to the load resistance $R_L$ as the turns ratio between the control and load windings of the amplifiers, and the feedback is directly coupled to the control circuit through the use of a direct connection 25. Also in this embodiment the voltage designated $E_b$ is simply the external feedback voltage obtained from across the feedback resistor $R_f$ so that before core saturation $E_b=0$ and after core saturation $E_b=E'_{ac}$. As indicated by this circuitry, the embodiment shown in Figure 2 is greatly simplified over that illustrated in Figure 1 in that no feedback bridge is required, and since the external feedback voltage $E_b$ is derived directly from the output circuit, the change in characteristics of the rectifiers in the output bridge with temperature variation will be inconsequential to the operation of the amplifier since the feedback voltage will vary accordingly and thereby promote extremely stable operation for the amplifier with temperature variation.

Also in connection with Figures 1 and 2 it will be noted that the control voltage is directly coupled to the control windings, (i.e. it is not coupled to the control windings through rectifiers) so that the problem of overcoming the barrier resistance of the control rectifiers is not present. Thus extremely small control sources $E_c$ may be used to control the output of the amplifier. More particularly it will be seen from Figure 2 that for the delivery of full output power from the amplifier the control voltage $E_c$ must equal the feedback resetting voltage $E'_{ac}$, and that the actual resetting voltage applied to the resetting core is equal to $E'_{ac}$ minus $E_c$ minus the $I_mR$ drops in the control circuit. Consequently, if it is desired to attain full output from the amplifier with small control voltages $E_c$, then small feedback voltages $E'_{ac}$ are required. Therefore, when $E'_{ac}$ is small the forward resistance of any rectifier included in the control circuit is large and the $I_mR$ drops across these rectifiers will be relatively large which will consequently reduce the resetting voltage to the point where it will be difficult if not impossible to reduce the power output to zero. Thus through the present invention where control rectifiers are eliminated the use of small control voltages for full-range control is made possible.

As mentioned heretofore, the core material employed by the present invention may be either high or low remanent material. As thus far described the core material has been assumed to be of the high remanent type where the core behaves as a magnetic "memory" device in which the core is used to absorb the energy needed to raise the core to saturation on the forward half-cycle or to shift it away from saturation on reset. Consequently if the cores 10 and 10*a* are assumed to have a hysteresis characteristic such as illustrated in a simplified manner in Figure 3, then it is no longer possible to assume that the supplies $E_c$ and $E_{ac}$ are the only sources of energy in the circuit since one or both of the cores 10 or 10*a* will also be capable of delivering energy.

Figure 3 shows the traversal of the hysteresis curves of the saturable inductors of Figure 2, during a single half-cycle of operation. Assuming the applied $E_{ac}$ is just sufficient to swing the flux level of the cores from one knee to the other and $E_c$ has been adjusted to produce about ⅓ maximum output. Further assume that the half-cycle of $E_{ac}$ having the polarity indicated has just started where the flux level of the two cores are at point 1, and core 10 is on its forward half-cycle and core 10*a* is on its resetting half-cycle. At this instant core 10*a* which has started to reset has its maximum stored energy. Since core 10*a* is on its reset half-cycle, the flux level therein starts to collapse and as it does so, the voltage across the load winding 14 rises to $E_{ac}$ and causes a small current $I_{II}$ to flow in the output circuit. At the same time the collapse in flux in core 10*a* induces a voltage across the control winding 12 thereof equal to $E_{ac}/N$, where N is the turns ratio between load and control windings. This induced voltage is added to the control voltage $E_c$ and appears across the load winding 13 of the forward half-cycle core 10 as a voltage equal to the sum of $E_{ac}+NE_c$ with the polarity indicated. The induced load voltage appearing across load winding 13 will block conduction in rectifier 21 and no current flows in the load winding of core 10. Thus in direct distinction to the case where the cores 10 and 10*a* were of the square loop type, it is apparent that the resetting core, core 10*a* in this case, is the primary source of energy and the control winding of the forward half cycle core 10 acts as the current limiting winding. Between points 1 and 2 of the curves of Figure 3, the control current is determined by core 10 and changes at a rate proportional to the sum of $E_{ac}+NE_c$. At point 2 the magnetizing current requirements for the two cores are the same. The load current $I_{II}$ which has been diminishing, disappears and $I_I$ begins to flow. Beyond point 2 the situation reverts to normal and the resetting core 10*a* limits the control current, the voltage across the load winding 13 equals $E_{ac}$, and the voltage across the load winding 14 drops to $E_{ac}-NE_c$. At point 3 core 10 saturates and power is then delivered to the load through load winding 13.

From the foregoing description, it will be recognized that the present invention permits the use of a wide range of core materials including either high or low remanent cores such as for example "Deltemax" on one hand and "Permalloy" on the other. Also by the elimination of control rectifiers the instant invention provides an extremely sensitive amplifier in which input signals of the order of $10^{-6}$ watts may be used for control purposes.

Although I have shown and described only certain specific embodiments of the present invention it must be understood that I am fully aware of the many modifications possible thereof. Therefore this invention is not to be limited except insofar as is indicated by the scope of the instant disclosure.

The invention described herein may be manufactured and used by or for the Government of the United States of America for governmental purposes without the payment of any royalties thereon or therefor.

What is claimed is:

1. In an electrical control system wherein an electrical load is to be energized from an alternating voltage supply, a reset magnetic amplifier comprising a pair of saturable core members each of which includes a similar load winding and similar control winding wound thereon, unilateral impedance means connecting the alternating voltage supply to the load through the respective load windings of said core to block load winding current in one direction, said impedance means being poled to permit the flow of load current through the respective load windings of said cores in sequential alternation, a control circuit connected to the control windings of said amplifier for controlling the output thereof, said control circuit including a control element serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

2. In an electrical control system wherein an electrical load is to be energized from an alternating voltage supply, a reset magnetic amplifier comprising a pair of saturable core members each of which has arbitrary remanence properties and a similar load winding and a similar control winding, unilateral impedance means connecting the alternating voltage supply to the load through the respective load windings of said cores to block load winding current in one direction, said impedance means being poled to permit the flow of load current through the respective load windings of said cores in sequential alternation, a control circuit for controlling the output from said amplifier including a control element serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

3. In an electrical control system wherein an electrical load is to be energized from an alternating voltage supply, a reset magnetic amplifier comprising a pair of saturable core members each of which includes a similar load winding and a similar control winding wound thereon, unilateral impedance means connecting the alternating voltage supply to the load through the respective load windings of said cores to block load winding current in one direction, said impedance means being poled to permit the flow of load current through the respective load windings of said cores in sequential alternation, a control circuit for controlling the output from said amplifier including a direct current control voltage serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

4. In an electrical control system wherein an electrical load is to be energized from an alternating voltage supply, a reset magnetic amplifier comprising a pair of saturable core members each of which has arbitrary remanence properties and a similar load winding and similar control winding, unilateral impedance means connecting the alternating voltage supply to the load through the respective load windings of said cores to block load winding current in one direction, said impedance means being poled to permit the flow of load current through the respective load windings of said cores in sequential alternation, a control circuit for controlling the output from said amplifier including a variable direct current voltage serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

5. A reset magnetic amplifier comprising a pair of high remanent saturable core members each having a similar load winding and a similar control winding wound thereon, means to connect an alternating voltage supply to the load windings of said cores to block load winding current in one direction and to magnetize first one of said cores and then the other of said cores in sequential half-cycle alternation, means to controllably demagnetize said cores in half-cycle alternation with respect to their magnetization including a control element serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

6. A reset magnetic amplifier comprising a pair of high remanent saturable core members each having a similar load winding and a similar control winding wound thereon, means to connect an alternating voltage supply to the load windings of said cores to block load winding current in one direction and to magnetize first one of said cores and then the other of said cores in sequential half-cycle alternation, means to controllably demagnetize said cores in half-cycle alternation with respect to their magnetization including a direct current control voltage serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

7. A reset magnetic amplifier comprising a pair of saturable core members each having a similar load winding and a similar control winding wound thereon, means to connect an alternating voltage supply to the load windings of said cores to block load winding current in one direction and to magnetize first one of said cores and then the other of said cores in sequential half-cycle alternation, means to controllaby demagnetize said cores in half-cycle alternation with respect to their magnetization including a control element serially connected in a single closed loop containing the control windings of both of said cores, and a feedback circuit connected between the output of the amplifier and the control circuit for feeding back to the control circuit a voltage in the same ratio to the supply voltage as the ratio of turns between the control and load windings of the amplifier.

8. A reset magnetic amplifier comprising a pair of saturable core members each having a similar load winding and a similar control winding wound thereon, means to connect an alternating voltage supply to the load windings of said cores to block load winding current in one direction and to magnetize first one of said cores and then the other of said cores in sequential half-cycle alternation, means to controllably demagnetize said cores in half-cycle alternation with respect to their magnetization including a control element serially connected in a single closed loop containing the control windings of both of said cores, and a constant voltage feedback circuit connected between the output of the amplifier and the control circuit for feeding back a voltage equal to the maximum voltage limit for the control voltage.

References Cited in the file of this patent

UNITED STATES PATENTS

| | | |
|---|---|---|
| 2,518,865 | Cartotto | Aug. 15, 1950 |
| 2,700,130 | Geyger | Jan. 18, 1955 |
| 2,747,109 | Montner | May 22, 1956 |